Patented Nov. 21, 1944

UNITED STATES PATENT OFFICE 2,363,193

PROCESS OF DEHYDRATING TOMATOES AND THE JUICES THEREOF

Henry J. Moore, Islington, Ontario, Canada

No Drawing. Application June 4, 1942, Serial No. 445,766

4 Claims. (Cl. 99—204)

This invention relates to a process of dehydrating fruits, vegetables, particularly juicy tomatoes, and the juices thereof, and my object is to devise a simple process in which a large proportion of the vitamin and mineral content is retained, a sticking of the material to the dehydrating plates or pans is prevented, and the resultant product is in a readily usable form which may be powdered, or compressed into tablets or other forms.

The tomatoes may be sliced and placed in a rust-proof or enamel coated pan which has been previously dusted with an edible substance in powdered form of flour-like consistency, such as a cereal flour, pea or bean meal, or a milk powder, to which has been added gelatine in powdered form. The contents of the pan are then subjected to a moderate dry heat either by sunlight or by means for heating the pan at a temperature from 70° F. to 100° F. After the slices have been partially dried they should be dusted with more of the same flour-like edible substance and turned over in the pan. A small amount of salt may be added to the flour and also a small amount of sugar.

Tomato juice is dehydrated by adding the powdered edible substance to the juice to form a thick fluid mixture. The mixture is poured on the pan and stirred when necessary, during the dehydrating process. When sufficiently solid it should be turned over. After about twelve hours of drying, the mixture forms a dry rubberlike mass or pad. I have found that in dehydrating tomato juice very satisfactory results are obtained by the following mixture: 16 ozs. of juice, 3 tablespoons of white flour and a small amount of salt, to which is added a small amount of gelatine powder.

When dehydrating either the slices or the juice, after about twelve hours of dehydration the material may be transferred from the pan to a copper screen through which warm dry air is passed to complete the drying process. At this stage the partially dried material may be moulded into balls, cubs or other suitable form if desired before final drying.

The complete drying process takes from 24 to 36 hours. When completely dry the material is a hard mass which may be ground to any desired fineness.

Flour contains a natural acid (phosphoric and lactic) which serves to retain vitamin C in the tomatoes. In addition, the flour contains vitamins and minerals which increases the vitamin and mineral content of the dried tomatoes. The juice of the tomatoes is absorbed by the flour which forms a protective coating which prevents sticking to the pan. If milk powder is used the natural food values of the milk powder are included in the final product. The salt serves as a preservative. The gelatine further protects the final product, prevents loss of essential food and vitamin values, and adds to the product the protein content of the gelatine. The final product may be coated with a thin film of gelatine.

While according to this process I preserve a large proportion of the essential food values of the tomatoes which are dehydrated, loss of vitamin content may be reduced and colour preserved by carrying out the dehydration process in the presence of sulphur fumes. The sulphur combines with the oxygen of the air to form sulfur dioxide which prevents oxidation of the food being dried.

A simple method of combining the sulphur with the air is to enclose the food in a chamber through which air is circulated and to burn sulphur candles in the chamber.

One-half ounce of dehydrated tomato powder mixed with and boiled in one pint of water will make a delicious soup. Milk or milk powder may be added to make a cream soup. Although tomatoes dehydrated by this process retain as high as 25% of the original vitamin C content of the tomatoes, the final product may, if desired, be reinforced with vitamin C. Milk powder, flavouring, or other substances may be added to the final product as desired.

I have found that the powder added to the tomatoes or juice tends to absorb and retain their natural colour, freshness, and flavour, and the salt and natural acid to preserve the product during dehydration and after, even to the extent that slices of tomato or solidified juices when not entirely dry will keep for a long time, in which state they possess a higher vitamin content. The tomatoes and other food products may in any of these forms be eaten without cooking or other treatment, much in the same manner as natural fruit is eaten.

What I claim as my invention is:

1. A process of dehydrating tomatoes which consists in adding an edible substance in powdered form including gelatine powder, to the tomatoes, and thereafter subjecting them to a moderate dry heat.

2. A process of dehydrating tomato juice which consists in adding an edible substance in powdered form including gelatine powder to the juice, and thereafter subjecting the mixture to a moderate dry heat.

3. A process of dehydrating tomatoes which consists in adding a cereal flour and gelatine powder to the tomatoes and thereafter subjecting them to a moderate dry heat.

4. A process of dehydrating tomato juice which consists in adding a cereal flour and gelatine powder to the juice, and thereafter subjecting the mixture to a moderate dry heat.

HENRY J. MOORE.